United States Patent
Isaacs (12)

(10) Patent No.: US 6,346,939 B1
(45) Date of Patent: Feb. 12, 2002

(54) VIEW DEPENDENT LAYER ORDERING METHOD AND SYSTEM

(75) Inventor: Paul M. Isaacs, San Francisco, CA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/303,994

(22) Filed: May 3, 1999

(51) Int. Cl.[7] .............................................. G06T 15/00
(52) U.S. Cl. ........................................ 345/421; 345/420
(58) Field of Search .................................. 345/418, 419, 345/420, 421, 422, 423, 424, 427

(56) References Cited

U.S. PATENT DOCUMENTS

| | | | | |
|---|---|---|---|---|
| 5,379,370 A | * | 1/1995 | Allain et al. ................. 345/422 |
| 5,649,079 A | * | 7/1997 | Holmes ....................... 345/423 |
| 6,130,672 A | * | 10/2000 | Yamazaki et al. ........... 345/427 |
| 6,259,452 B1 | * | 7/2001 | Coorg et al. ................. 345/421 |
| 6,268,859 B1 | * | 7/2001 | Andresen et al. ........... 345/421 |

* cited by examiner

Primary Examiner—Cliff N. Vo

(57) ABSTRACT

Method and system are provided for specifying view dependent ordering of geometry that occupies co-incident surfaces. A co-incident surface has a first side and a second side. The co-incident surface is capable of being viewed on either side. A first order of the geometry layers is defined as viewed on the first side of the co-incident surface. In response to a specified view, a rendering order of the geometry layers is determined from the first order. The rendering order specifies an actual rendering sequence of the geometry layers.

28 Claims, 10 Drawing Sheets

VIEW DEPENDENT LAYER ORDERING METHOD AND SYSTEM

BACKGROUND OF THE INVENTION

1. Field of the Invention

This invention relates generally to the field of computer graphics, and more particularly to a method for ordering objects that occupy a co-incident surface.

2. Description of the Related Art

Modem computer systems are widely used to model and render three-dimensional (3D) objects on two-dimensional (2D) display screens. For example, a variety of jobs that were usually drawn by hand (e.g., movie animation, architectural drawings, engineering drafting) are now performed with sophisticated computer graphics applications. These modern 3D computer graphics applications are able to render 3D images of not only a single fixed image, but also render views of the image dynamically as viewpoint and direction are changed. The term "viewpoint" refers to the point at which the viewer is located and is sometimes referred to as camera position, eye position, center of projection, or the like. The term "view direction" refers to the direction of view from the viewpoint and is commonly referred to as camera direction, eye direction, direction of projection, or the like. As the viewpoint and view direction change from one frame to the next, the 3D images are rendered dynamically to reflect the scene relative to the new viewpoint and the direction.

The changes in viewpoint and direction may occur in several forms in 3D viewing. For example, an object in a 3D space may be viewed from any spatial position: front, back, above, below, or side. Furthermore, an object such as a building, sphere, or the like may be viewed from the inside or outside of the object. These changes in viewpoint and direction directly affect the way an object is to be described and rendered.

For example, in 3D computer graphics, two or more objects are often drawn on a same plane in space when they essentially lie on the same plane. FIG. 1A illustrates a perspective view of a table 102 with a plurality of cards 106. The cards 106 are placed on a top surface 104 of the table 102. When viewed from a view direction 108 above the table 102, the cards 106 appear on top of the surface 104 of the table 102. However, when viewed from a view direction 110 below the table 102, the cards 106 are not visible. Similarly, FIG. 1B shows a road surface 120 having a plurality of median stripes 122 painted thereon. The stripes 122 are visible when viewed from a view direction 124 above the road surface 120. On the other hand, they are not visible when viewed from a view direction 126 below the road surface.

In rendering the table 102 with the cards 106 or the road surface 120 with the stripes 122, conventional techniques have typically modeled the cards 106 and the surface 104 of the table 102 or the stripes 122 and the road surface 120 as co-planar polygons. Rendering these objects as being co-planar polygons, however, produces jitter about the co-planar regions. Since the layers are co-planar, the question "which layer is in front?" has no single answer. So algorithms that advance pixel-by-pixel across the screen, rendering the front-most surface at each pixel, are subject to error. Each pixel's query may return any answer, and adjacent pixels may display colors from different layers in the surface. This visual discontinuity across the surface is commonly referred to as jitter, z-tearing, or z-buffer tearing. If no enhancements are made from the basic algorithm, then techniques such as ray-tracing and z-buffer rendering will produce errors. The set of techniques that produce these errors, however, is not restricted to those of ray-tracing and z-buffer rendering. In some instances, the mathematical modeling of the co-planar polygons leads to z-buffer tearing or other degrading artifacts.

Additionally, the conventional methods have suffered from discontinuous or choppy images. For example, in one frame, the card 106 may appear to be over the top surface 104 of the table 102. In another frame, the card 106 may actually appear to be under the table 102. The inconsistent rendering of the objects thus degrades graphics image quality and produces unrealistic images.

To address such problems, one method has rendered two or more co-planar objects by rendering one object slightly above or below the other object. While this solution improves the jitter effects, it is highly sensitive to the separation distance between the two objects. For instance, if the distance between the two objects is too far, one object may appear to be floating over or hanging below the other due to the separation between them. On the other hand, if the distance were too small, the previously described jitter effect may be produced. In either case, the resulting image would not accurately convey the desired effect of one object resting upon another.

Another method has implemented a fixed stacking order technique. This method specifies the order of a number of layers (e.g., co-planar objects) and then renders the layers in the specified order. FIG. 2A shows a node tree 200 depicting a fixed stacking order 202. The node tree 200 comprises a layer group node 204, which branches out to a plurality of nodes 206, 208, 210, and 212. The nodes 206, 208, 210, and 212 represent layer "A," layer "B," layer "C," and layer "D," respectively. The node tree specifies the stacking order 202 from left to right, i.e., from layer "A" to layer "D." Accordingly, the node tree 200 is traversed in the order of nodes 206, 208, 210, and 212 to render the layers from the lowest to the highest layer. Each layer is allowed to draw over any previous layer at all points, without comparing the relative distance from the eye. The result is layers that appear to lie correctly atop each other.

FIG. 2B illustrates an orthographic view of the stacking order 202 of the layers "A," "B," "C," and "D." As shown, the layers are specified and rendered from back to front, i.e., from lowest to the highest. Thus, the lowest layer "A" is rendered first, then the second layer "B" is rendered on top of layer "A." Next, the third layer "C" is drawn over layer "B" and finally, the highest layer "D" is rendered over the layer "C."Unfortunately however, the fixed order of the conventional method does not allow rendering of a surface having two distinct sides from two distinct viewpoints. This is because the stacking order is fixed regardless of changes in view parameters such as viewpoint, view direction, or the like. For example, the stacking order 202 of FIGS. 2A and 2B only provides back-to-front drawing order of a surface and thus does not provide for jitter-free rendering of the other side of the surface as viewed from the opposite side. Hence, the problem of rendering co-planar or co-incident surface layers from other viewpoints is not adequately addressed by the conventional method.

In view of the foregoing, what is needed is a method for specifying and changing the ordering of co-planar or co-incident surface layers in response to changes in viewpoint or view direction without undesirable jitter or aliases.

SUMMARY OF THE INVENTION

The present invention fills these needs by providing method and system for determining view dependent ordering of geometry layers that occupy a co-incident surface. It should be appreciated that the present invention can be implemented in numerous ways, including as a process, an apparatus, a system, a device, a method, or a computer readable medium. Several inventive embodiments of the present invention are described below.

In one embodiment, the present invention provides a method for determining view dependent ordering of geometry layers that occupy a co-incident surface. The co-incident surface has a first side and a second side, and is capable of being viewed on either side. In this method, a first order of the geometry layers is defined as viewed on the first side of the co-incident surface. In response to a specified view, a rendering order of the geometry layers is determined from the first order. The rendering order specifies an actual rendering sequence of the geometry layers. In one embodiment, the rendering order is the first order when the specified view is directed on the first side of the co-incident surface and is a reversed order of the first order when the specified view is directed on the second side of the co-incident surface.

In another embodiment, a method is provided for rendering geometry layers that occupy a co-incident surface relative to a view. The co-incident surface has a first side and an opposing second side. The co-incident surface is capable of being viewed on either side of the co-incident surface. The method includes: (a) defining a first order of the geometry layers as viewed on the first side of the co-incident surface; (b) receiving a specified view directed on either the first or second side; (c) determining a rendering order of the geometry layers from the first order in response to the specified view, wherein the rendering order specifies an actual rendering sequence of the plurality of geometry layers; and (d) rendering the geometry layers in the rendering order.

In yet another embodiment, the present invention provides a computer system for determining view dependent ordering of geometry layers that occupy a co-incident surface. The co-incident surface has a first side and a second side. The co-incident surface is capable of being viewed on either side of the co-incident surface. The system includes a bus, a processor coupled to the bus, and a memory coupled to the bus. The system also includes means for defining a first order of the geometry layers as viewed on the first side of the co-incident surface. In addition, the system includes means for determining a rendering order of the geometry layers from the first order in response to a specified view, wherein the rendering order specifies an actual rendering sequence of the plurality of geometry layers.

By thus providing a flexible rendering order based on a view-dependent stacking order, the present invention allows the co-incident layers to be rendered dynamically from one frame to another in a proper order without artifacts or aliases despite substantial changes in the view or geometry parameters. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

The present invention, method and system for determining view dependent ordering of geometry layers that occupy a co-incident surface, is described. It will be obvious, however, to one skilled in the art, that the present invention may be practiced without some or all of these specific details. In other instances, well known process operations have not been described in detail in order not to unnecessarily obscure the present invention.

The present invention provides a view dependent stacking order that is adapted to provide a rendering order of a plurality of layers that occupies a co-incident surface. The co-incident surface is used as a "flip-surface" (e.g., flip-plane) to specify a relationship between a predefined stacking order and a subsequent rendering order. The flip-surface has a pair of sides. The stacking order is defined in reference to one of the sides facing a particular view. In response to changes in view (e.g., viewpoint, view direction, etc.) or variables (e.g., layer parameters, surface parameters, etc.), the layers occupying the co-incident surface are rendered in either the original stacking order or the reverse stacking order in one embodiment. Thus, the layers are rendered dynamically and realistically from one frame to another despite substantial changes in the view or parameters.

In one embodiment, the co-incident surface is a plane upon which the layers are to be rendered. These co-planar layers are initially ordered in a predefined stacking order with respect to a view being on a predetermined side of the plane. Rendering order of the co-planar layers is then determined for a specified view. When the specified view is in the opposite side of the predetermined side, then the rendering order is determined by "flipping" the stacking order. Hence, the plane functions as a reference "flip-plane" for flipping the stacking order in response to changes in view or variables.

Figure 1A:
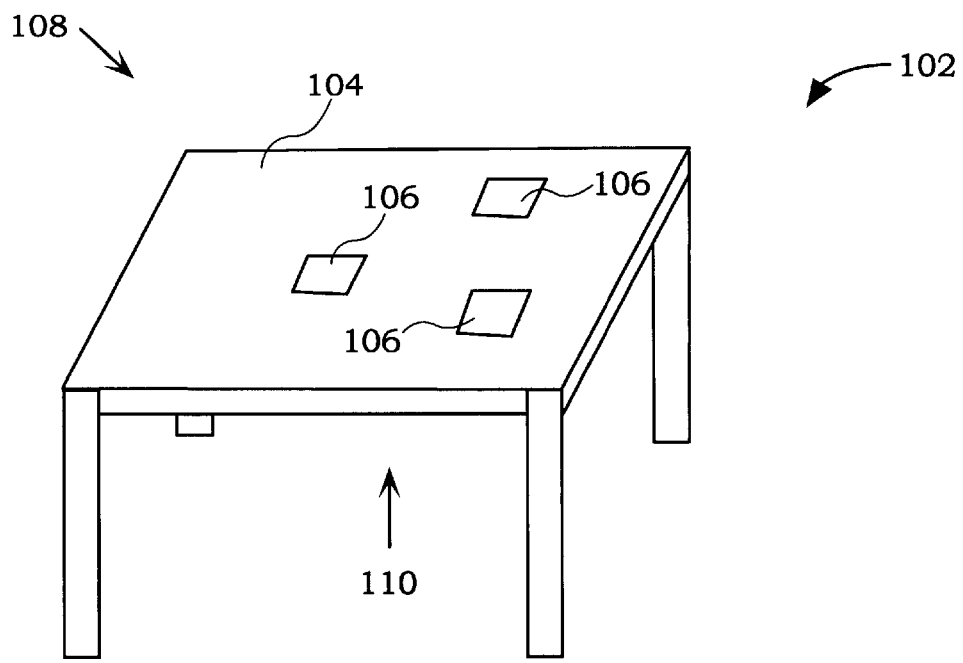
FIG. 1A illustrates a perspective view of a table with a plurality of cards.
Figure 1B:
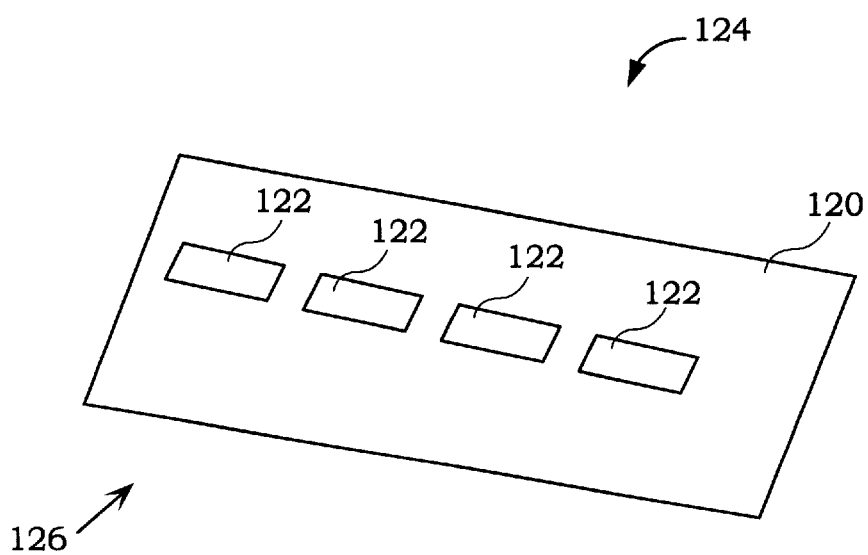
FIG. 1B shows a road surface having a plurality of median stripes painted thereon.
Figure 2A:
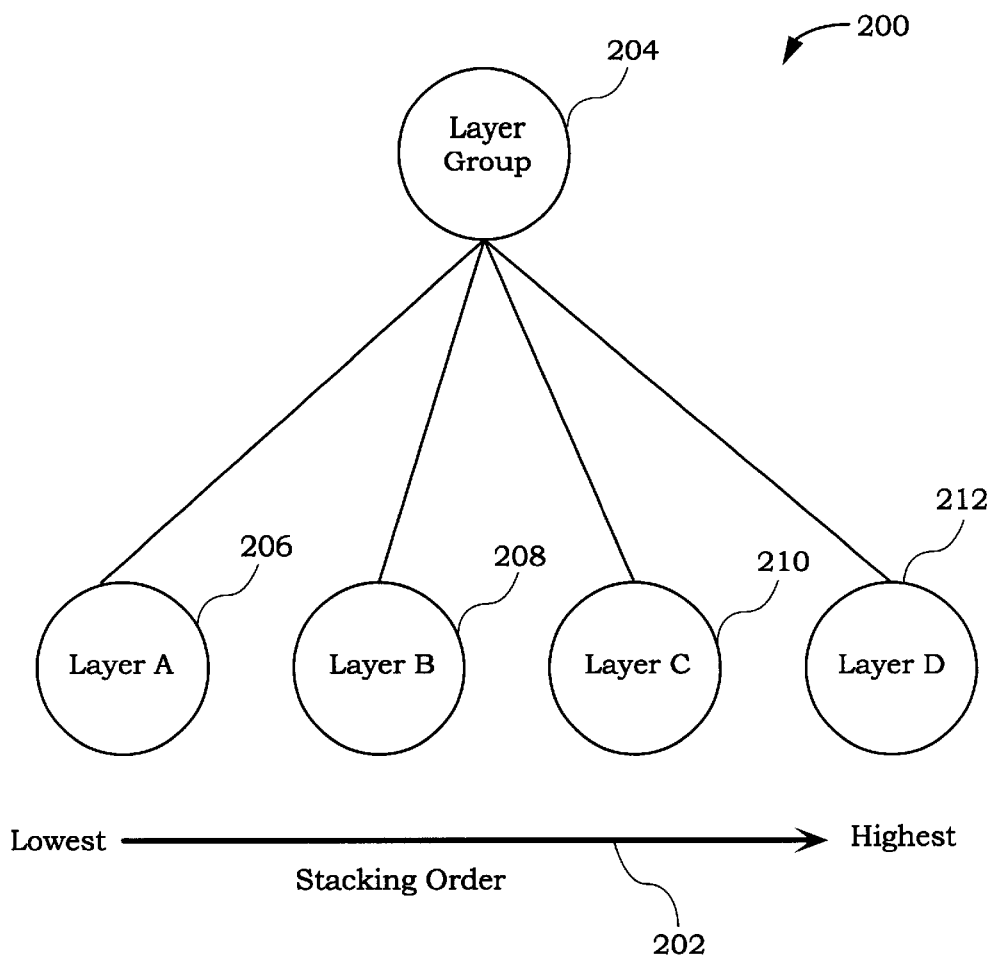
FIG. 2A shows a node tree depicting a fixed stacking order.
Figure 2B:
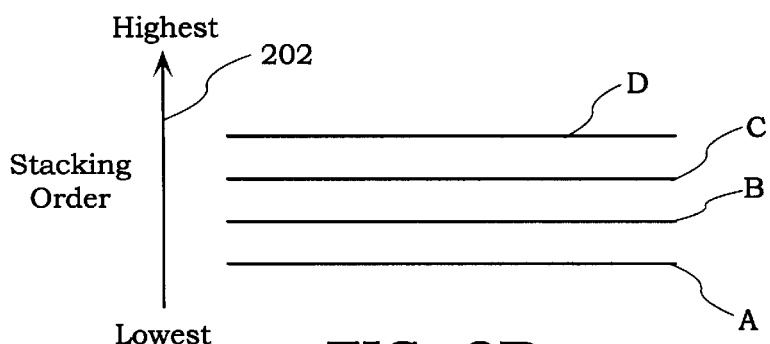
FIG. 2B illustrates an orthographic view of the stacking order of a plurality of layers.
Figure 3A:
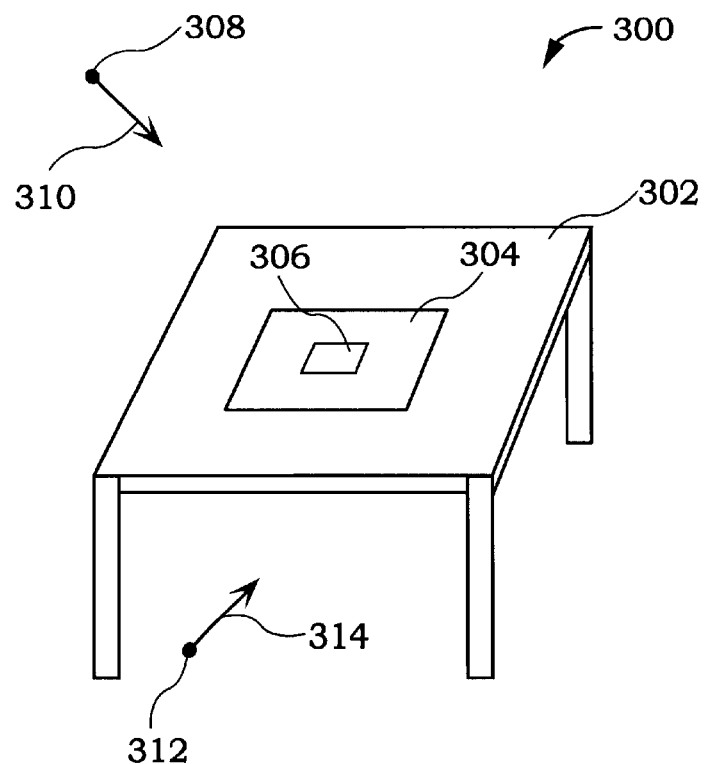
FIG. 3A illustrates a perspective view of a table over which a tablecloth and a card are disposed.

FIG. 3A illustrates a perspective view of a table 300 over which a thin tablecloth 304 and a card 306 are disposed. The tablecloth 304 is placed on a top surface 302 of the table 300. The card 306 is, in turn, placed on the tablecloth 304. In this way, the card 306, tablecloth 304, and top surface 302 of the table 300 are co-planar. That is, they occupy a co-incident plane for rendering purposes.

In this perspective view of the table 300, the rendering order of the co-planar table surface 302, tablecloth 304, and card 306 depends on whether the table 300 is viewed from above or below the table surface 302. For example, when viewed from a viewpoint 308 in a view direction 310, the rendering order is from back to front. That is, the objects are rendered in the order of the table surface 302, tablecloth 304, and card 306. On the other hand, when viewed from a viewpoint below the co-incident plane, the rendering order is reversed. For instance, when rendering the co-incident geometry layers from a viewpoint 312 in a view direction 314, the geometry layers are drawn in a sequence of the card 306, tablecloth 304, and table surface 302. Based on these observations, the present invention orders co-incident geometry layers in accordance with changing views or geometry variables such as geometry parameters, surface parameters, etc.

Figure 3B:
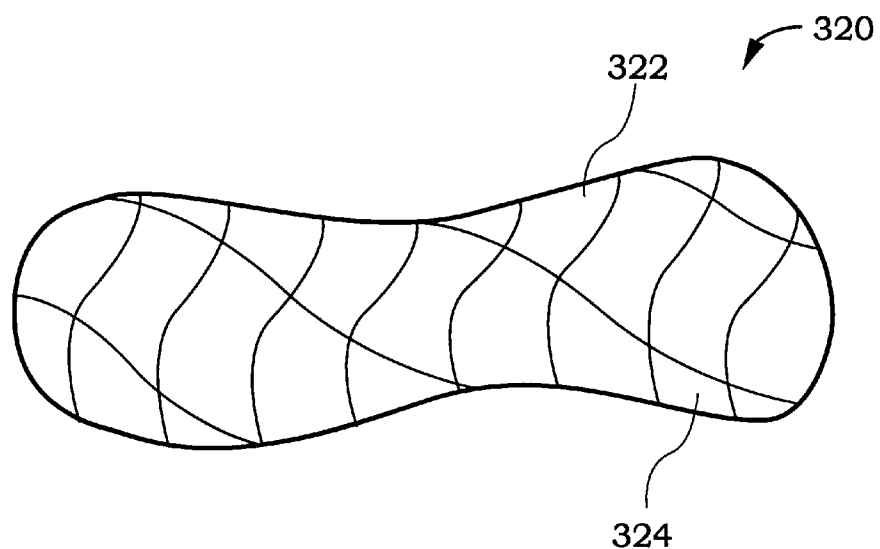
FIG. 3B shows a three-dimensional object having a curved surface.

The changes in the ordering of geometry layers may also occur when three-dimensional objects have a curved surface. FIG. 3B shows a three-dimensional object 320 having a curved surface 322. The object 320 also has a parametric grid 324 over the curved surface 322. The parametric grid 324 occupies a co-incident surface corresponding to the curved surface 322. In this arrangement, when the object 320 is viewed from the outside, its curved surface 322 is rendered before the rendering of the parametric grid 324. On the other hand, if the object 320 is assumed to be hollow such that the object can be viewed from within the object, then the rendering sequence is reversed. In this case, the parametric grid 324 would be rendered before the rendering of the curved surface 322. In this manner, the geometry layers 322 and 324 are rendered in a correct sequence to preserve realism.

Figure 3C:
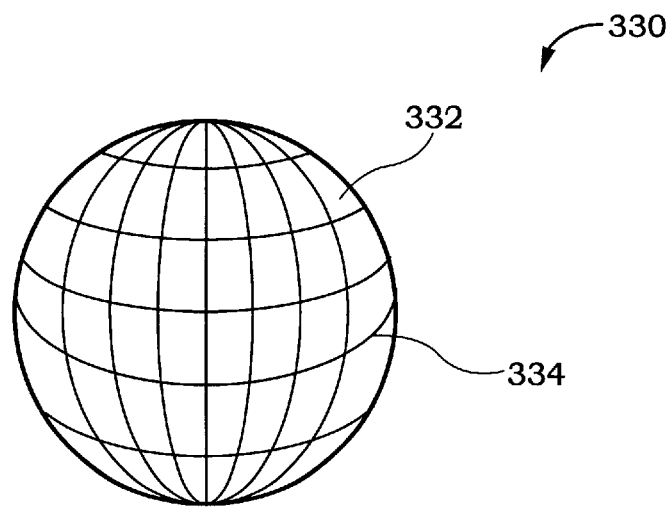
FIG. 3C illustrates an exemplary sphere having a grid in the form of longitude and latitude lines.
Figure 3D:
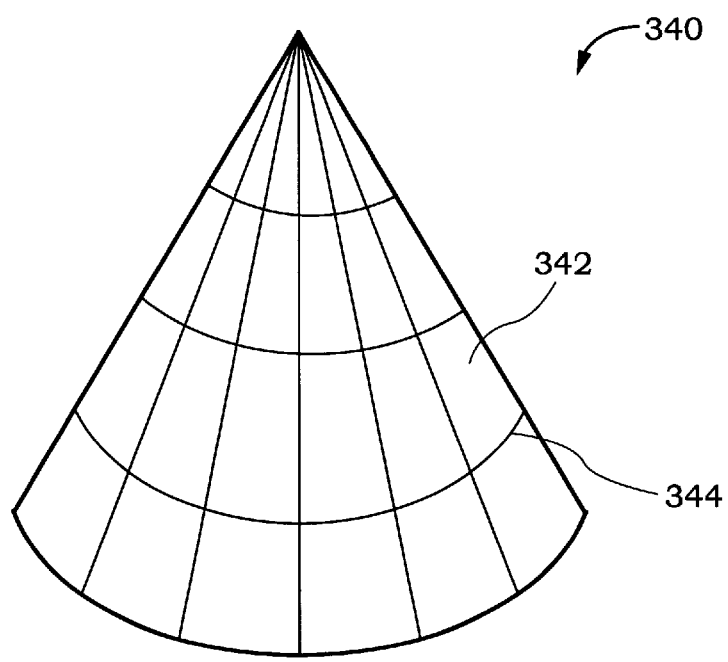
FIG. 3D shows a three-dimensional cone having a grid placed on its surface.

FIG. 3C illustrates an exemplary sphere 330 having a grid 334 in the form of longitude and latitude lines. The sphere 330 has a surface 332 upon which the grid 334 is placed. For proper rendering, the surface 332 of the sphere 330 is rendered first when viewed from the outside of the sphere 330. Then, the grid 334 is drawn over the surface 332 to accurately portray the globe 330. From an internal viewpoint, however, the rendering sequence is reversed. Specifically, the grid 334 is rendered first and then the surface 332 of the sphere 330 is rendered over the grid 334 so that the grid is not visible when viewed from within the sphere 330. FIG. 3D similarly shows a three-dimensional cone 340 having a grid 344 placed on a surface 342. As illustrated above in FIGS. 3B and 3C, the rendering order of the cone surface 342 and the grid 344 in FIG. 3D changes in relation to whether the view is external or internal to the cone 330.

Figure 4A:
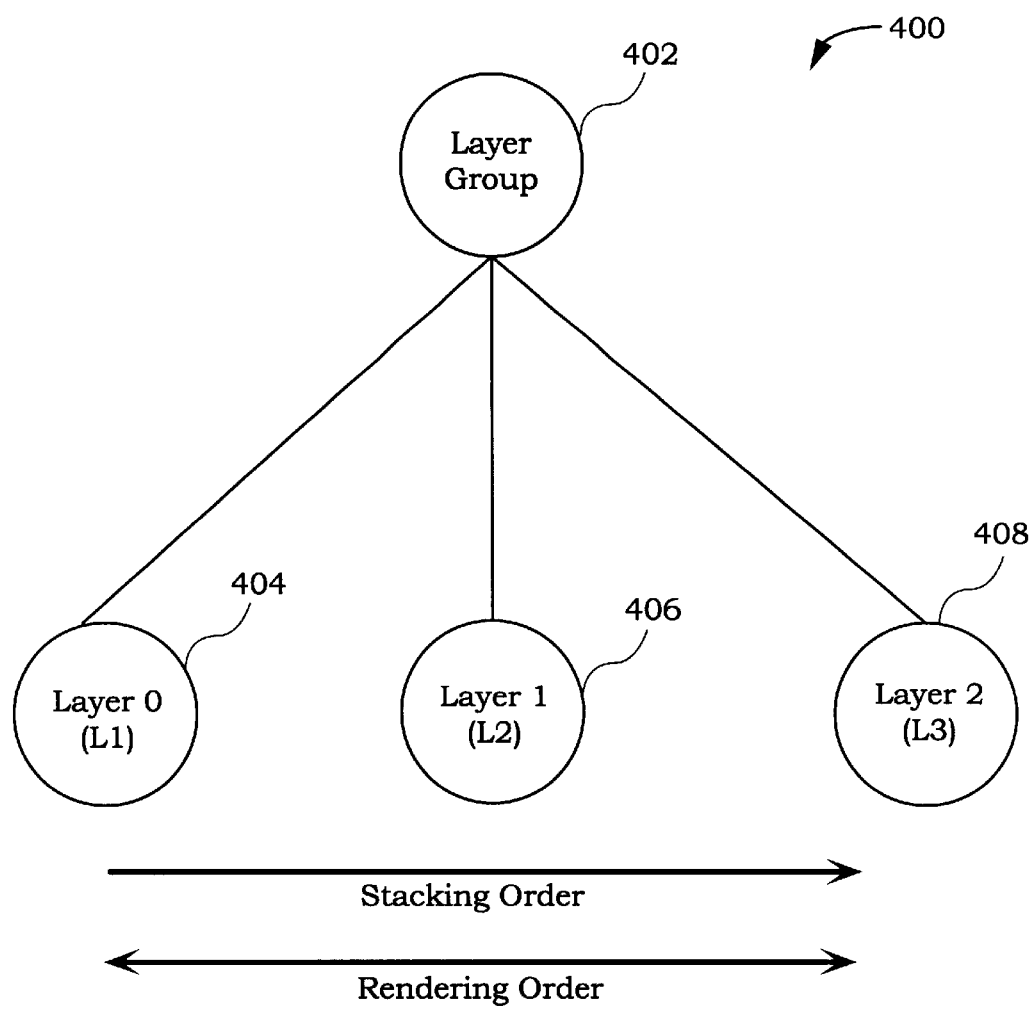
FIG. 4A illustrates a scene graph depicting the ordering of a plurality of geometry layers in accordance with one embodiment of the present invention.

FIG. 4A illustrates a scene graph 400 depicting the ordering of a plurality of geometry layers in accordance with one embodiment of the present invention. The scene graph 100 includes a layer group head node 402, and layer 0 (L0) node 404, layer 1 (L1) node 406, and layer 2 (L2) node 408. The layer nodes 404, 406, and 408 represent geometry layers that are to be rendered in sequence. As described herein, the geometry layers represent layers of geometry that occupy a co-incident surface and includes but is not limited to, planes, surfaces, graphics primitives, and the like. The scene graph 400 including its nodes may be implemented as a data structure as is well known in the art. Although the scene graph shows layers L0, L1, and L2, it should be appreciated that the present invention may include and render any number of geometry layers on a co-incident surface.

In the scene graph 400 of FIG. 4A, a stacking order is defined from layer L0 404 to layer L2 408. That is, the stacking order describes a traversal sequence of the layers from layer L0 404 to layer L1, and then to layer L2. Hence, the stacking order defines an order of the geometry layers to be drawn as viewed on one side of the co-incident surface. In response to a specified view, a rendering order of the layer L0, layer L1, and layer L2 is determined. This rendering order specifies the actual rendering sequence of the geometry layers.

In one embodiment, the rendering order may either be a forward stacking order or reverse forward stacking order. As implied, the forward stacking order is identical to the stacking order while the reverse stacking order is a reversed stacking order. The rendering order is determined to be the forward stacking order when the specified view is on the same side of the co-incident surface as was used in determining the stacking order. If, however, the specified view is on the other side of the co-incident surface, the rendering order is reversed such that the sequence of the rendering order is layer L2, layer L1, and layer L0. For example, the layer L0 may correspond to the table surface 302 while the layer L1 corresponds to the tablecloth 304 of FIG. 3A. Likewise, the card 306 of FIG. 3A may be represented by layer L2.

Figure 4B:
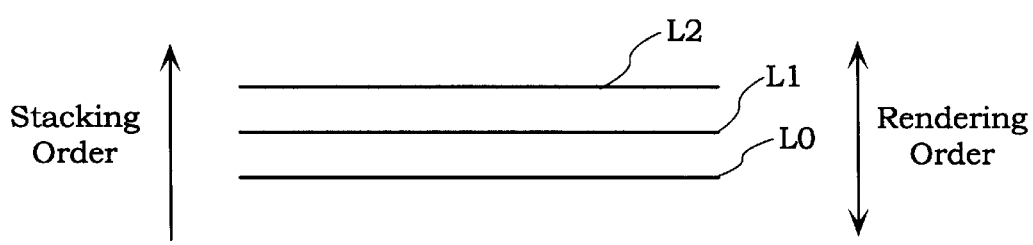
FIG. 4B illustrates a relationship between a stacking order and a rendering order in accordance with one embodiment of the present invention.

FIG. 4B illustrates a relationship between the stacking order and the rendering order of FIG. 4A in accordance with one embodiment of the present invention. The stacking order is described as a sequence of layer 0 (L0), layer 1 (L1), and layer 2 (L2). The layer L0 is the layer of lowest order while the layer L2 is the layer of highest order. The rendering order can be identical as the stacking order or a flipped (i.e., reversed) version of the stacking order. By thus providing a rendering order in both directions, the present invention allows efficient and proper ordering of geometry layers that occupy a co-incident surface as a function of view variables.

Figure 5A:
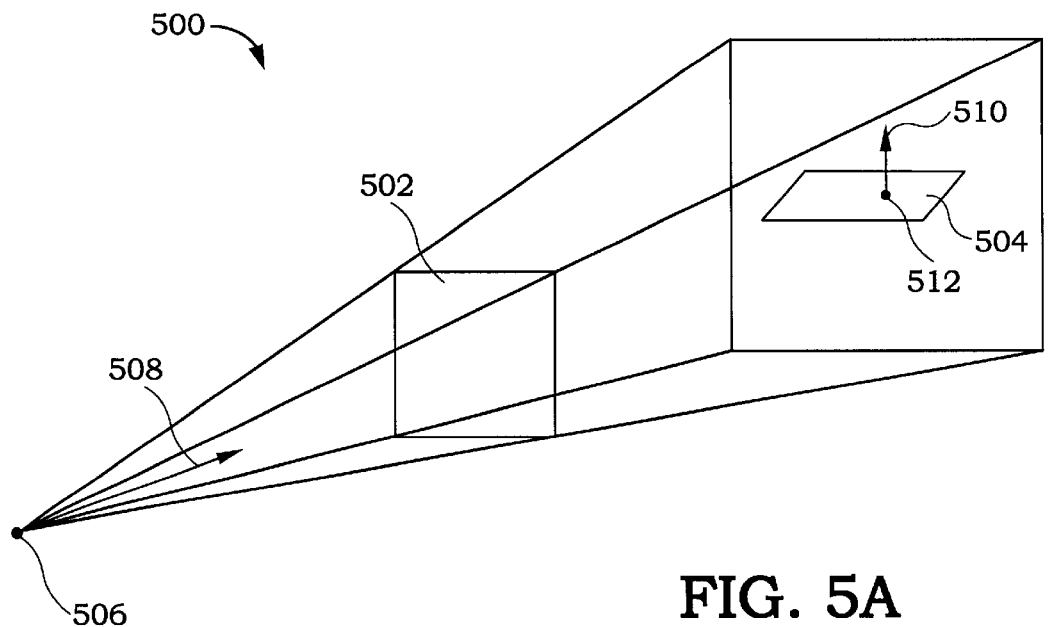
FIG. 5A shows a view frustum for depicting a perspective view of a co-incident plane projected onto a projection plane.

In rendering a plurality of geometry layers on a co-incident surface, a variety of well-known projection techniques may be used. For example, FIG. 5A shows a view frustum 500 for depicting a perspective view of a co-incident plane 504 projected onto a projection plane 502. The view frustum 500 defines the rendering space of a scene. In this perspective projection, each point in the scene is projected onto the image by connecting it in a line to an eye point 506 and intersecting that line with the projection plane 502. Accordingly, distant objects appear smaller than near objects. The co-incident plane 504 can be described by a normal vector 510 originating at a point 512 on the surface of the co-incident plane 504.

In this setting, the direction of the normal vector defines one side of the co-incident plane with respect to the normal vector while the opposite direction of the normal vector defines the opposite side of the co-incident plane. As will be described in more detail below, when the eye point 506 lies above the co-incident plane, then the geometry layers are drawn from back to front order. On the other hand, if the eye point 506 lies below the co-incident plane with respect to the normal vector, the geometry layers are drawn from front to back order. Whether the eye point lies above or below the co-incident plane may be determined by inserting the eye point into a standard plane equation and examining the sign of the result in accordance with one embodiment of the present invention.

Figure 5B:
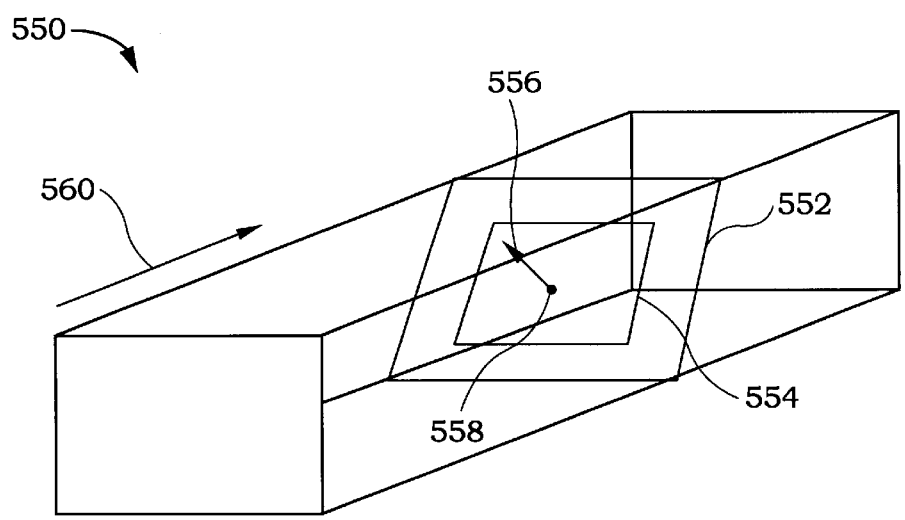
FIG. 5B illustrates an orthographic view of a view volume in accordance with another embodiment of the present invention.

FIG. 5B illustrates an orthographic view of a view volume 550 in accordance with another embodiment of the present invention. Orthographic view is sometimes known as flat or parallel projection view because objects are projected in parallel without change in size. Orthographic projections are frequently used when preserving dimensions is an important element in rendering such as in CAD, technical drawings, etc. Within the view volume 550, a pair of geometry layers 552 and 554 is illustrated as seen from a view direction 560, which can be described by a view direction vector. The geometry layers 552 and 554 occupy the same co-incident surface. A normal vector 556 at a given point 558 on the co-incident surface can be defined to describe the co-incident surface. The side of the co-incident surface on which the view direction lies can then be determined from the dot product of the view direction vector 560 and the normal vector 556.

Figure 6:
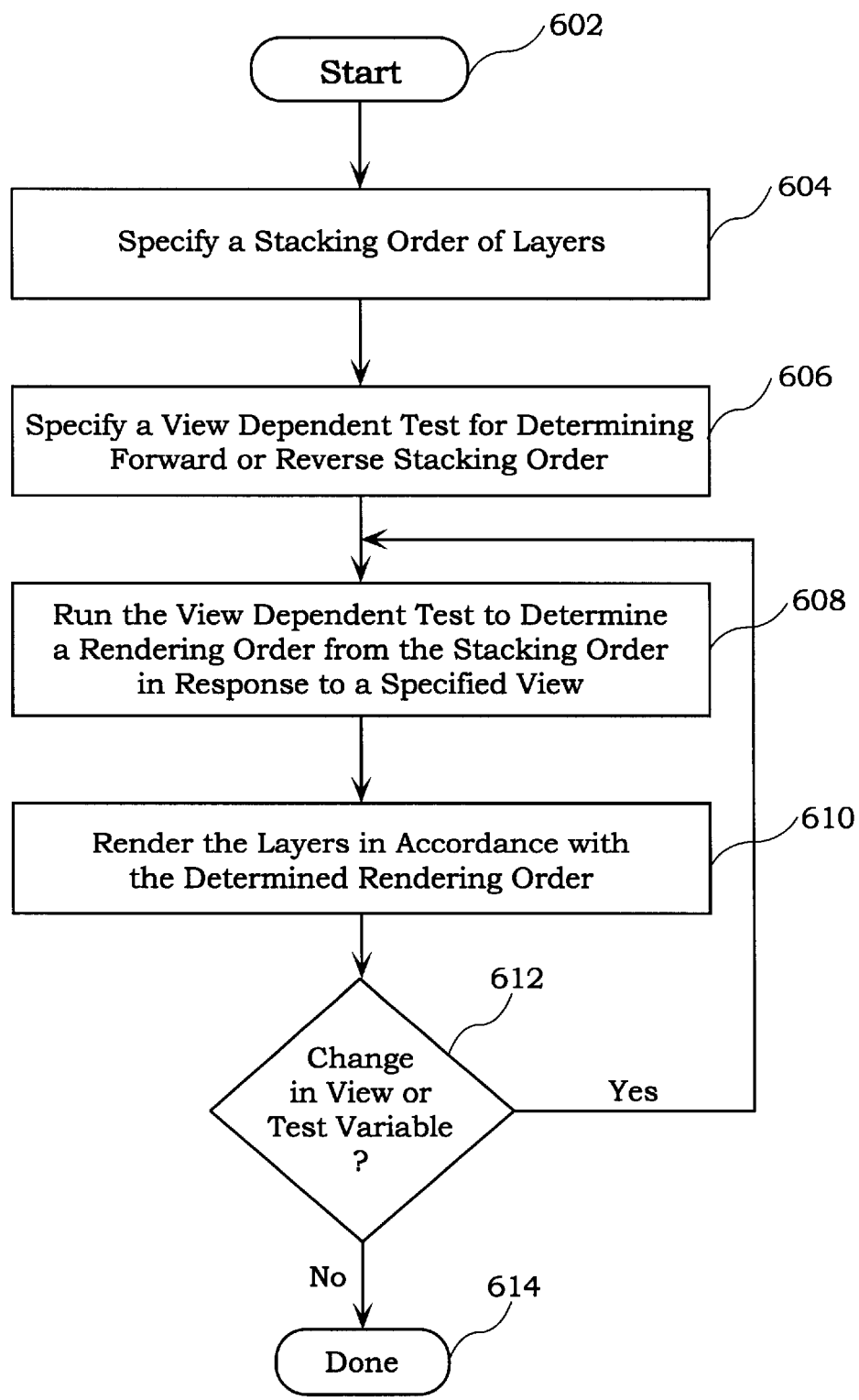
FIG. 6 shows a flowchart of an exemplary method for specifying a rendering order of a plurality of geometry layers in accordance with a specified view.

FIG. 6 shows a flowchart of a method for specifying a rendering order of a plurality of geometry layers in accordance with a specified view. The method starts in operation 602 and proceeds to operation 604, where a stacking order of geometry layers is specified, preferably the stacking order is defined as viewed on one of the sides of a co-incident surface. Then in operation 606, a view-dependent test is specified for determining a forward or reverse stacking order. As will be described in more detail below, the forward stacking order is the same order as the stacking order initially specified in operation 604. The reverse stacking order is a reverse of the specified stacking order.

Once the view-dependent test has been specified, the view-dependent test is run, in operation 608, to determine a rendering order from the stacking order in response to a specified view. In a preferred embodiment, the view-dependent test determines whether the rendering order is a forward or reverse stacking order. For example, the rendering order is determined to be the forward stacking order when the specified view is directed on the same side of the co-incident surface as the view used in specifying the stacking order of layers. However, when the specified view is directed on the other side of the co-incident surface, the reversed stacking order is determined to be the rendering order.

Once the rendering order has been determined, the layers are rendered, in operation 610, in sequence of the rendering order. The rendering of the layers is performed on a per-frame basis, one frame at a time. Hence, the view or test variable may change from one frame to the next. Then in operation 612, it is determined whether the view or test variable (e.g., surface location, surface orientation) has changed for a new frame. If there has been a change in the view or test variable, the method proceeds back to operation 608 to run the view-dependent test again for rendering the layers. If there has been no change in view or test variable, the method terminates in operation 614.

Figure 7:
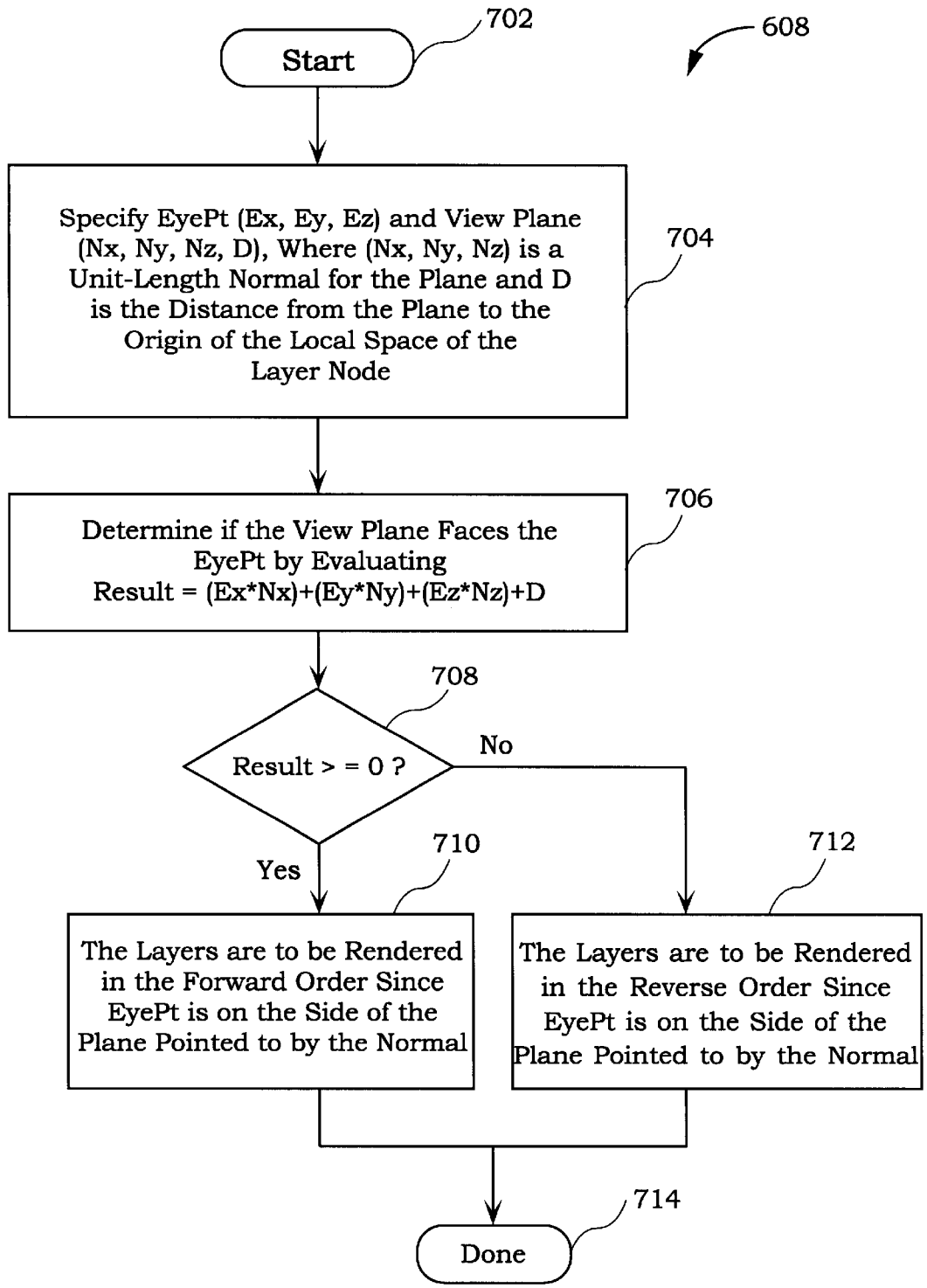
FIG. 7 shows a more detailed flowchart of a method for determining a rendering order for a perspective projection view in accordance with one embodiment of the present invention.

FIG. 7 shows a more detailed flowchart of the method operation 608 for determining a rendering order for a perspective projection view. The method begins in operation 702 and proceeds to operation 704, where eye point vector (Ex, Ey, Ez) and co-incident plane (Nx, Ny, Nz, D) are specified. The plane is described by a unit length normal vector (Nx, Ny, Nz) and D corresponds to the distance from the plane to the origin of the local space of the layer node. Then in operation 706, it is determined if the plane faces the eye point by computing (Ex*Nx)+(Ey*Ny)+(Ez*Nz)+D. The method as illustrated herein is preferably performed in local coordinate space; however, the method also works in world coordinate space. It is noted that in a typical scene traversal, transforming the eye point into local space is generally less costly than transforming the view plane into world space.

In operation 708, it is determined if the result is greater than or equal to zero. If yes, the plane faces the eye point. That is, the eye point lies on the same side of the plane pointed to by the normal. Hence, the rendering order of the layers is determined to be in the forward stacking order in operation 710. In addition, if the eye point is on the plane, then the rendering order is also assumed to be in the forward stacking order. In an alternative embodiment, the rendering order may also be in the reverse stacking order if the eye point is on the plane. If, on the other hand, the result is less than zero, then the view plane does not face the eye point, i.e., the eye point lies on the other side of the view plane in the opposite direction of the normal. In this case, the rendering order of the layers is determined to be in the reverse stacking order in operation 712. The method then terminates in operation 714.

Figure 8:
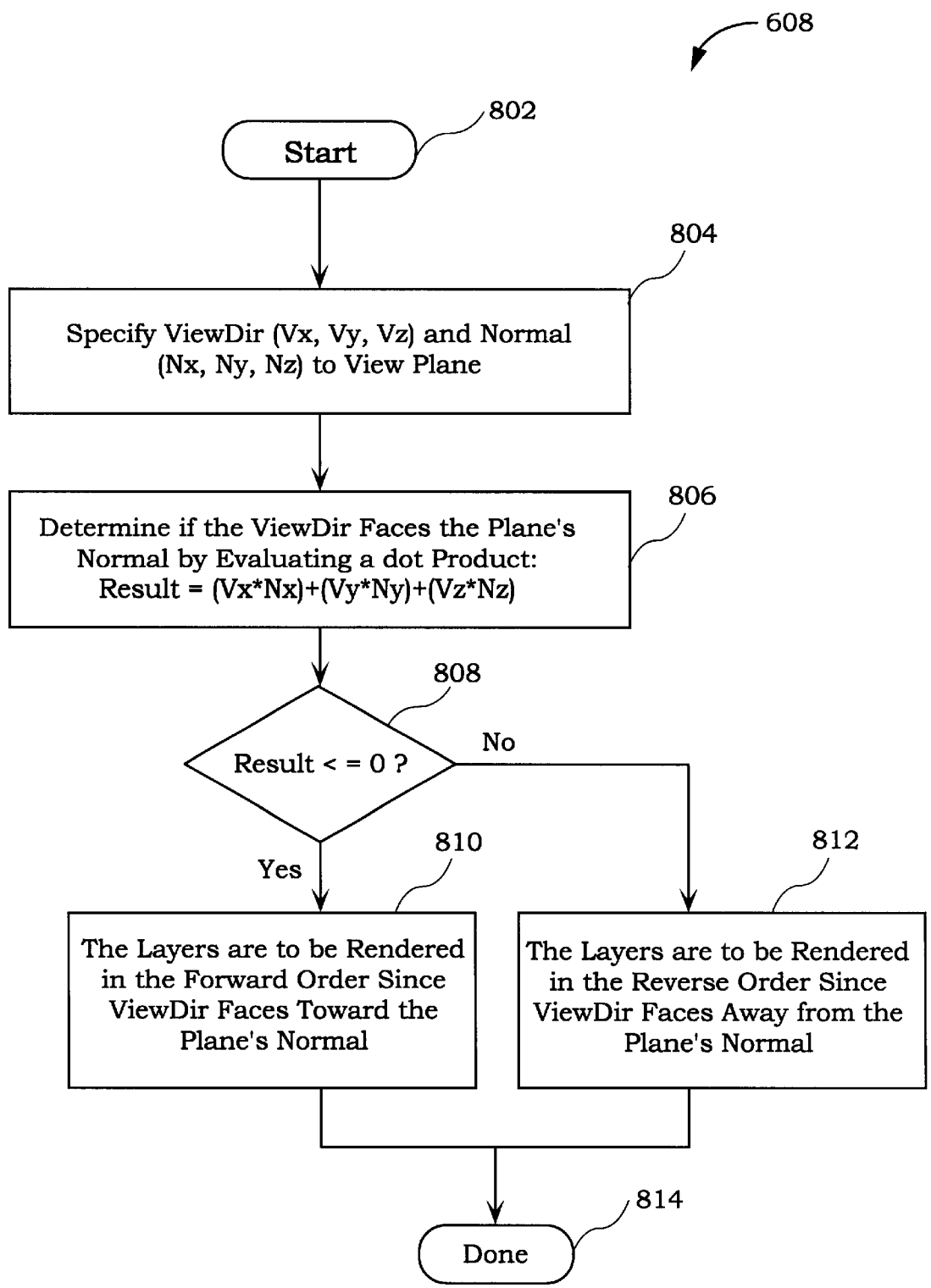
FIG. 8 shows a more detailed flowchart of the method for determining rendering order for an orthographic projection view in accordance with one embodiment of the present invention.

For an orthographic projection view, FIG. 8 shows a more detailed flowchart of the method operation 608 for determining rendering order for an orthographic projection view in accordance with one embodiment of the present invention. The method begins in operation 802 and proceeds to operation 804, where view direction vector (Vx, Vy, Vz) and normal vector (Nx, Ny, Nz) to a co-incident plane are specified. Then in operation 806, it is determined if the view direction vector faces the plane's normal vector by evaluating a dot product, (Vx*Nx)+(Vy*Ny)+Vz*Nz), between the view direction vector and the normal vector. Preferably, the method is performed in a local coordinate space; however, the method may also be performed in a world coordinate space.

In operation 808, it is determined whether the result of the dot product is less than or equal to zero. If so, the layers are determined to be rendered in the forward order since the view direction vector faces toward the plane's normal vector in operation 810. This assumes that if the view direction is on the plane, then the layers are drawn in the forward stacking order. However, the layers may also be rendered in reverse stacking order. If, on the other hand, the result of the DOT product is greater than zero, then the layers are determined to be rendered in the reverse order of the stacking order in operation 812 since the view direction vector faces away from the plane's normal vector. The method then terminates in operation 814.

Figure 9:
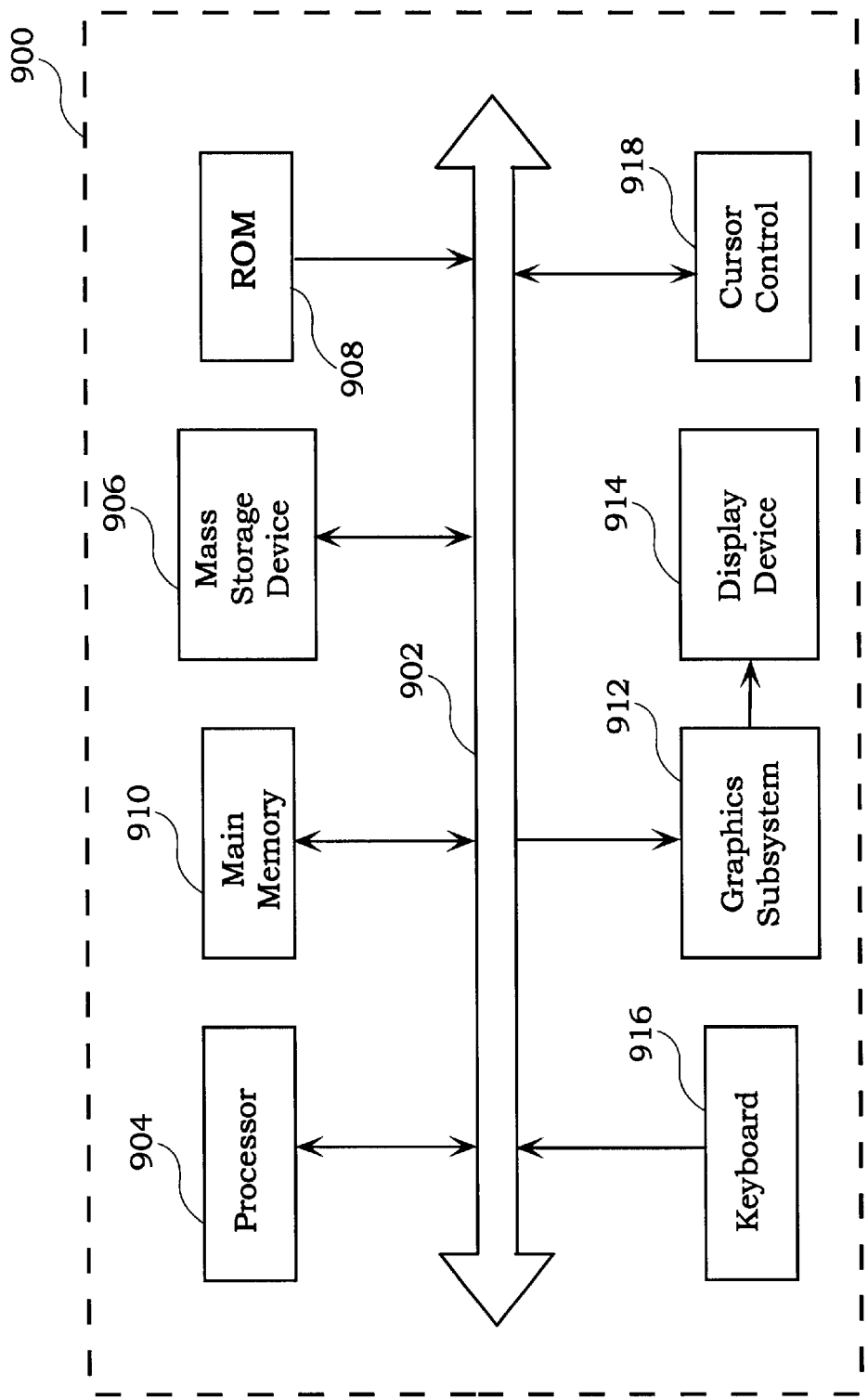
FIG. 9 illustrates a block diagram of a computer graphics system within which the present invention may be implemented or practiced.

FIG. 9 illustrates a block diagram of a computer graphics system 900 within which the present invention may be implemented or practiced. It should be appreciated that the computer graphics system 900 is exemplary only and that the present invention can operate within a number of different computer system configurations including general purpose computer systems, embedded computer systems, and computer systems specially adapted to electronic design automation. In describing various embodiments of the present invention, certain processes and operations are realized as a series of instructions (e.g., software programs) that reside within computer readable memory units of computer graphics system 900 and are executed by processors therein.

The computer graphics system 900 may be any computer-controlled graphics system suitable for generating 2D or 3D images. The computer graphics system 900 includes a bus 902 for transmitting digital information between the various parts of the computer system. One or more processors 904 for processing information are coupled to the bus 902. The information, together with the instructions for processing the information, are stored in a hierarchical memory system comprised of a mass storage device 906, a read only memory (ROM) 908, and a main memory 910. The mass storage device 906 is used to store a vast amount of data and may include one or more hard disk drives, floppy disk drives, optical disk drives, tape drives, CD-ROM drives, or any number of other types of storage devices having media for storing data digitally. The ROM 908 is used to store digital data on a permanent basis, such as instructions for the microprocessors. The main memory 910 is used for storing digital data on an intermediate basis. The main memory 910 can be DRAM, SDRAM, RDRAM, or any other suitable memory for storing data while the computer graphics system 900 is turned on.

A graphics subsystem 912 may be included in the computer graphics system 900. The processor 904 provides the graphics subsystem 912 with graphics data, such as drawing commands, coordinate vertex data, and other data related to an object's geometric position, color, texture, shading, and other surface parameters. In particular, the processor 904 may provide information, including but not limited to, such as descriptions of geometry, current point of view, and descriptions of layering including conditions affecting rendering order such as viewpoint, view direction, etc. A display device 914 is coupled to the graphics subsystem 912 to receive image data (e.g., pixel data) for display. Alternatively, the display device 914 may be coupled to the graphics system 900 via the bus 902.

Other devices may also be coupled to the computer graphics system 900. For example, an alphanumeric keyboard 916 may be used for inputting commands and other information to processor 904 via the bus 902. Another type of user input device is cursor control device 918 (e.g., mouse, trackball, joystick, and touchpad) used for positioning a movable cursor and selecting objects on a computer screen.

The present invention, method and system for determining view dependent ordering of geometry layers that occupy a co-incident surface, is thus described. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. In a computer system, a method for determining view dependent ordering of geometry layers that occupy a co-incident surface, said co-incident surface having a first side and a second side, said co-incident surface capable of being viewed on either side of said co-incident surface, the method comprising:

defining a first order of said geometry layers as viewed on said first side of said co-incident surface; and determining a rendering order of said plurality of geometry layers from said first order in response to a specified view, said rendering order specifying an actual rendering sequence of said plurality of geometry layers.

2. The method as recited in claim 1, wherein the method further comprises:

rendering said geometry layers in said rendering order.

3. The method as recited in claim 1, wherein said rendering order is said first order when said specified view is directed on said first side of said co-incident surface.

4. The method as recited in claim 3, wherein said rendering order is a reversed order of said first order when said specified view is directed on said second side of said co-incident surface.

5. The method as recited in claim 1, wherein said operation of determining said rendering order comprises:

determining a side of said co-incident surface on which said specified view is directed;

when said specified view is directed on said first side of said co-incident surface, specifying said first order as said rendering order; and when said specified view is directed on said second side of said co-incident surface, reversing said first order and specifying said reversed order as said rendering order.

6. The method as recited in claim 5, wherein said co-incident surface is a plane and wherein said side on which said specified view is directed is associated with a normal vector for indicating a direction of said side, wherein said specified view is described by a view point, and wherein said side on which said specified view is directed is determined by evaluating whether said view point lies above or below said side with respect to said normal vector.

7. The method as recited in claim 6, wherein whether said view point lies above or below said side with respect to said normal vector is evaluated by inserting said view point into a plane equation defined by said plane.

8. The method as recited in claim 6, wherein said view point is a perspective view eye point.

9. The method as recited in claim 5, wherein said side on which said specified view is directed is associated with a normal vector for indicating a direction of said side, wherein said specified view is described by a view vector, and wherein said side on which said specified view is directed is determined by computing a dot product of said normal vector and said view vector.

10. The method as recited in claim 9, wherein said view vector is an orthographic view direction vector.

11. The method as recited in claim 1, wherein said co-incident surface is a planar surface.

12. The method as recited in claim 1, wherein said co-incident surface is part of an object selected from a group consisting essentially of a plane, a sphere, a cylinder, a cone, and a cube.

13. The method as recited in claim 1, wherein said co-incident surface is a parametric surface.

14. In a computer system, a method for rendering geometry layers that occupy a co-incident surface relative to a reference view, said co-incident surface having a first side and an opposing second side, said co-incident surface capable of being viewed on either side of said co-incident surface, the method comprising:

defining a first order of said geometry layers as viewed on said first side of said co-incident surface;

receiving a specified view directed on either said first or second side of said co-incident surface;

determining a rendering order of said plurality of geometry layers from said first order in response to said specified view, said rendering order specifying an actual rendering sequence of said plurality of geometry layers; and rendering said geometry layers in said rendering order.

15. The method as recited in claim 14, wherein said rendering order is said first order when said specified view is directed toward said first side of said co-incident surface.

16. The method as recited in claim 14, wherein said rendering order is a reversed order of said first order when said specified view is directed toward said second side of said co-incident surface.

17. The method as recited in claim 14, wherein said operation of determining said rendering order comprises:

determining a side of said co-incident surface on which said specified view is directed;

when said specified view is directed toward said first side of said co-incident surface, specifying said first order as said rendering order; and when said specified view is directed toward said second side of said co-incident surface, reversing said first order and specifying said reversed order as said rendering order.

18. The method as recited in claim 17, wherein said determined side is associated with a normal vector for indicating a direction, wherein said specified view is described by a view vector, and wherein said determined side is obtained by computing a dot product of said normal vector and said view vector.

19. The method as recited in claim 17, wherein said determined side is associated with a normal vector for indicating a direction and said specified view is described by a view point, wherein said side on which said specified view is directed is determined by evaluating whether said view point lies above or below said determined side with respect to said normal vector.

20. The method as recited in claim 14, wherein said co-incident surface is a planar surface.

21. The method as recited in claim 14, wherein said co-incident surface is part of an object selected from a group consisting essentially of a plane, a sphere, a cylinder, a dome, and a cube.

22. The method as recited in claim 14, wherein said co-incident surface represents a surface of a three-dimensional object having an internal side and an external side, wherein said first side is said external side and said second side is said internal side.

23. A computer system for determining view dependent ordering of geometry layers that occupy a co-incident surface, said co-incident surface having a first side and a second side, said co-incident surface capable of being viewed on either side of said co-incident surface, the system comprising:

a bus;

a processor coupled to said bus;

a memory coupled to said bus;

means for defining a first order of said geometry layers as viewed on said first side of said co-incident surface; and means for determining a rendering order of said plurality of geometry layers from said first order in response to a specified view, said rendering order specifying an actual rendering sequence of said plurality of geometry layers.

24. The system as recited in claim 23, wherein the system further comprises:

means for rendering said geometry layers in said rendering order.

25. The system as recited in claim 23, wherein said first order defines a sequence of said geometry layers to be rendered when said specified view is directed on said first side of said co-incident surface.

26. The system as recited in claim 23, wherein said rendering order is determined by reversing said first order when said specified view is directed on said second side of said co-incident surface.

27. The system as recited in claim 23, wherein said rendering order is determined by:

determining a side of said co-incident surface on which said specified view is directed;

when said specified view is directed on said first side of said co-incident surface, specifying said first order as said rendering order; and when said specified view is directed on said second side of said co-incident surface, reversing said first order and specifying said reversed order as said rendering order.

28. The system as recited in claim 23, wherein said co-incident surface is a planar surface.

* * * * *